United States Patent
Gill et al.

(10) Patent No.: US 6,898,036 B2
(45) Date of Patent: May 24, 2005

(54) SYSTEM AND METHOD FOR RECOVERY FROM WRITING ERRORS DURING DATA STORAGE

(75) Inventors: Richard Allen Gill, Arvada, CO (US); Keith Gary Boyer, Thornton, CO (US); Steven Gregory Trabert, Boulder, CO (US)

(73) Assignee: Storage Technology Corporation, Louisville, CO (US)

( * ) Notice: Subject to any disclaimer, the term of this patent is extended or adjusted under 35 U.S.C. 154(b) by 223 days.

(21) Appl. No.: 10/044,773

(22) Filed: Dec. 31, 2001

(65) Prior Publication Data

US 2003/0123175 A1 Jul. 3, 2003

(51) Int. Cl.[7] ............................. G11B 5/09; G11B 27/36
(52) U.S. Cl. ............................. 360/53; 360/31; 360/46
(58) Field of Search ............................. 360/53, 75, 31, 360/46, 48, 44, 50, 72.1, 60

(56) References Cited

U.S. PATENT DOCUMENTS

| | | | | |
|---|---|---|---|---|
| 3,778,787 A | * | 12/1973 | Cannon | ........................ 360/26 |
| 4,922,352 A | * | 5/1990 | Culp | ........................... 360/39 |
| 5,771,131 A | * | 6/1998 | Pirzadeh | .................. 360/77.08 |
| 5,903,532 A | * | 5/1999 | Ikeda | ........................... 360/48 |
| 6,288,862 B1 | | 9/2001 | Baron et al. | |
| 6,327,112 B1 | * | 12/2001 | Ide et al. | ................. 360/78.04 |
| 6,519,715 B1 | * | 2/2003 | Takashi et al. | ................ 360/53 |
| 2002/0008928 A1 | * | 1/2002 | Takahashi | .................... 360/53 |
| 2002/0101674 A1 | * | 8/2002 | Ichihara et al. | ............... 360/60 |

* cited by examiner

*Primary Examiner*—David Hudspeth
*Assistant Examiner*—Glenda P. Rodriguez
(74) *Attorney, Agent, or Firm*—Brooks Kushman P.C.

(57) ABSTRACT

A system and method for recovering from write errors during writing of a moving storage medium suspend write current while allowing the storage medium to continue moving. The system and method continue to format data for writing while the write current is suspended and resequence the data for subsequent storage. Information is recorded to distinguish previously written data from current data with error correction pointers adjusted accordingly. Write errors may be detected in a track following streaming tape system based on data errors from a read back check or based on positioning errors of a read/write head servo system, for example. By allowing the storage medium to continue moving through the error event, the system and method improve speed, capacity utilization, and throughput of the storage and retrieval process.

23 Claims, 4 Drawing Sheets

SYSTEM AND METHOD FOR RECOVERY FROM WRITING ERRORS DURING DATA STORAGE

BACKGROUND OF THE INVENTION

1. Field of the Invention

The present invention relates to a system and method for improved recovery from a tracking error when writing data to a storage medium.

2. Background

A number of strategies for storing data on various types of storage media have been developed. Whether using sequential or random access to retrieve data, most strategies attempt to store as much data in contiguous sections or blocks of the media to better utilize the media capacity, decrease seek time, and increase throughput, i.e. to improve overall performance of the storage and retrieval process. In addition, most strategies use some form of error detection and/or correction and error recovery mechanisms to insure the integrity of data during storage and subsequent retrieval. For example, a read back check may be used to read stored data immediately after writing the data to detect and/or correct corrupted data, which is then rewritten on the fly, i.e. without stopping the recording medium.

As data density increases, proper read/write head positioning becomes more critical to reliably storing and retrieving data. This is particularly true for systems which read and/or write multiple tracks or channels of data simultaneously because positioning errors affect data on all of the multiple tracks or channels. Storage devices have been developed which use one or more read/write head tracking channels to provide proper head positioning during reading and writing of data. These tracking channels do not store user data, but provide feedback for the position of the read/write head relative to the storage medium so that fine positioning adjustments of the read/write head can be made.

Storage devices incorporating track following technology must be able to quickly detect when the recording head is moving off-track to prevent overwriting of existing data. An off-track event may be indicated due to a media defect or anomaly in the servo track that prevents sufficient information from being available to validate proper head positioning. In addition, the positioning system itself may indicate an off-track event or tracking error by incorrectly sensing that the read/write head is about to go off-track. Regardless of the cause of an actual off-track event or false indication of an off-track event, the system must respond by immediately suspending the writing of data to avoid over-writing adjacent tracks or channels that may contain customer data. Once the writing has been interrupted by the off-track indication, the device is stopped, repositioned and the entire data block is rewritten. This recovery procedure is usually successful provided the event was not caused by media defects.

Each time an off-track event actually occurs, or is inaccurately detected, the error recovery process of stopping the media, repositioning, and re-recording the entire data block reduces the performance of the system. As track density continues to increase, the corresponding head positioning tolerances are likely to trigger more actual or perceived off-track events that may significantly impact performance of various types of recording media, particularly tape media.

SUMMARY OF THE INVENTION

A system and method for recovering from write errors during writing of a moving storage medium suspend write current while allowing the storage medium to continue moving. The system and method continue to format data for writing while the write current is suspended to avoid overwriting previously stored data due to a read/write head tracking error. Data formatted with proper sequencing information while the write current is suspended is rewritten downstream without stopping the storage medium. Information is recorded to distinguish previously written data from current data with error correction pointers adjusted accordingly. Write errors may be detected in a track following streaming tape system based on data errors from a read back check or based on positioning errors of a read/write head servo system, for example. By allowing the storage medium to continue moving through the error event, the system and method improve speed, capacity utilization, and throughput.

In one embodiment, a system and method for writing data on a storage medium according to the present invention include detecting a writing error, suspending write current in response to the writing error while allowing the storage medium to continue moving, repositioning data that would have been stored during the suspending of the write current, and supplying a write current to store the repositioned data on the storage medium. A writing error may be detected based on a comparison of data read immediately after being written during a read back check with the original data. If the errors exceed a threshold based on the capability of the error correction information to accurately recreate the data on a subsequent read, write current may be suspended with data sub-blocks having associated sequence information repositioned and written out of sequence downstream without stopping the recording medium to reposition. If the writing error spans a specified portion of time or a specified portion of the storage medium capacity, the storage medium may be stopped and repositioned. Alternatively, for systems having read/write head tracking information on the recording medium, a write error may be indicated by the read/write head servo system if the read/write head position appears to be off-track or moving off-track to prevent unintended overwriting of previously stored data. Data may be rewritten downstream if the write current suspension spans a specified time or portion of the storage medium such that the data can not be reliably recovered using the error correction code.

The present invention provides a number of advantages. For example, the present invention improves overall efficiency of the storage process by improving capacity utilization, overall recording speed, and throughput. Capacity utilization is improved by providing write pass information and sequencing information within smaller recording units or sub-blocks of data which can be repositioned when necessary without rewriting an entire data block. Overall recording speed and throughput are improved by reducing the number of stops and restarts of the recording medium. In addition, the present invention may reduce wear on various components of the storage device and the storage media by reducing the number of stops and restarts.

The above advantages and other advantages and features of the present invention are readily apparent from the following detailed description when taken in connection with the accompanying drawings.

DETAILED DESCRIPTION OF THE PREFERRED EMBODIMENT(S)

The present invention may be used with any type and/or form factor of storage media, which may include an associated carrier or housing. The preferred embodiment of the present invention is described with reference to a removable storage medium in the form of a magnetic tape contained within a cartridge type housing. Other types of suitable storage media include, but are not limited to, optical, metallic films, dye-polymer films, bubble forming material, magneto-optical, amorphous to crystalline phase transition, and semiconductor media. Storage media characteristics may allow for many write cycles, or just one write cycle on any given area depending upon the particular application. The media form factor may include a tape, a disk, a card, or an integrated circuit, for example. As will be appreciated by those of ordinary skill in the art, while the present invention is particularly useful for sequential-type storage media such as tape media, the invention is independent of the type or form factor of the storage medium and may be applied to numerous types of storage media, some of which are specifically identified herein. The cartridge, housing, or media itself may be used in fixed and/or removable media applications.

In one preferred embodiment of the present invention, stored information is arranged in "smart" units or sub-blocks generally arranged in a sequential nature on the media, which includes linear, serpentine, and spiral paths arrangements, for example. As explained in greater detail below, each sub-block includes header and/or trailer information for sequencing and error detection and/or correction. Error detection and/or correction information may include write-pass information as described in greater detail in U.S. Pat. No. 6,288,862 B1 assigned to the assignee of the present invention. While the present invention is particularly suited for applications where recording blocks generally appear at the read/write head in order from the first recording block to the last recording block, the present invention can be used in applications where individual recording blocks and/or contiguous segments or sections of related recording blocks or sub-blocks are scattered across the storage media.

The present invention generally applies to technologies where data are written and read verified using both a write head and read head simultaneously in addition to those technologies utilizing one or a plurality of concurrent write and read channels or tracks. Likewise, the present invention is particularly suited for recording technologies that use parallel track recording where multiple recording passes down the same recording medium occur and data are written adjacent to previously written data. Adjacent data may be written with the storage medium moving in the same direction as in linear recording, or in the opposite direction as in serpentine recording. The present invention is also applicable to recording technologies using track following techniques that may be required to read and write fine pitch tracks.

Figure 1:
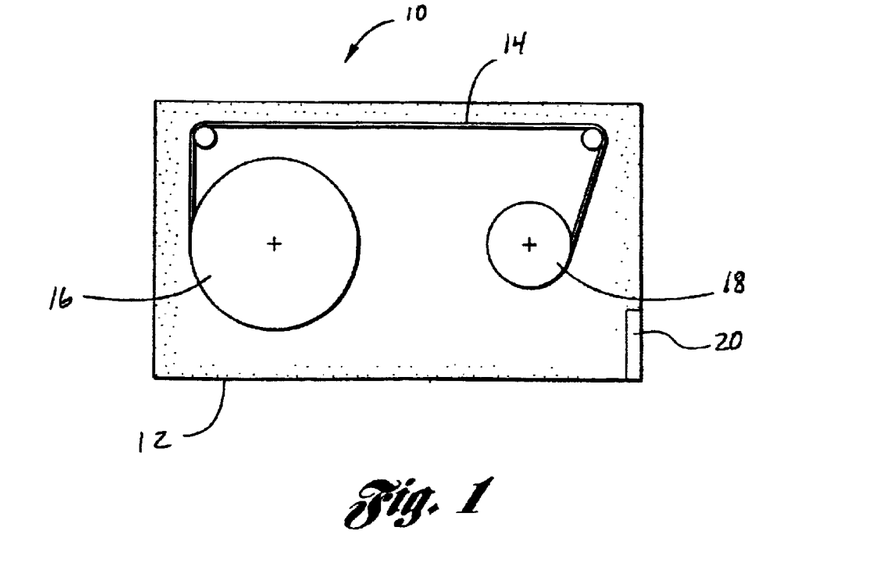
FIG. 1 illustrates a representative storage medium for use with a system or method according to one embodiment of the present invention.

FIG. 1 illustrates a representative data volume or storage medium for use with a system or method for recovery from writing errors according to the present invention. In one preferred embodiment, data volume 10 is a removable storage medium that includes a cartridge or housing 12 that contains a tape 14, which moves between a first spool 16 and second spool 18 during reading and writing of data. In addition to tape 14, data volume 10 may also include non-volatile memory 20 for storing information relative to the entire data volume. For example, write-pass information, which may be used to distinguish current from previously written data, may be stored in memory 20 and/or on tape 14. In a representative data recording session using a linear path, information including user data, error detection and correction information, sequencing information, etc. is written to multiple tracks or channels on tape 14 simultaneously as tape 14 moves from spool 16 to spool 18. A read back check (RBC) is used to simultaneously read back information written to tape 14 to verify its accuracy. When previous systems detected certain types of errors, such as a read/write head off-track error, the writing process would be interrupted and spools 16, 18 immediately stopped. Tape 14 would then be repositioned by reversing the path from spool 18 to spool 16 to a point prior to the error (or even to the beginning of the tape or device block) where the tape was again stopped and reversed to attempt to write the data again.

As described in greater detail below, in accordance with one embodiment of the present invention, data storage is temporarily interrupted when certain errors occur to prevent unintentional overwriting of previously stored information, but tape 14 (and spools 16, 18) continues to move while moveable portions of the data are repositioned downstream on tape 14. By reducing or eliminating the mechanical aspects of the error recovery process, the present invention generally improves overall efficiency of the storage and retrieval process.

Figure 2:
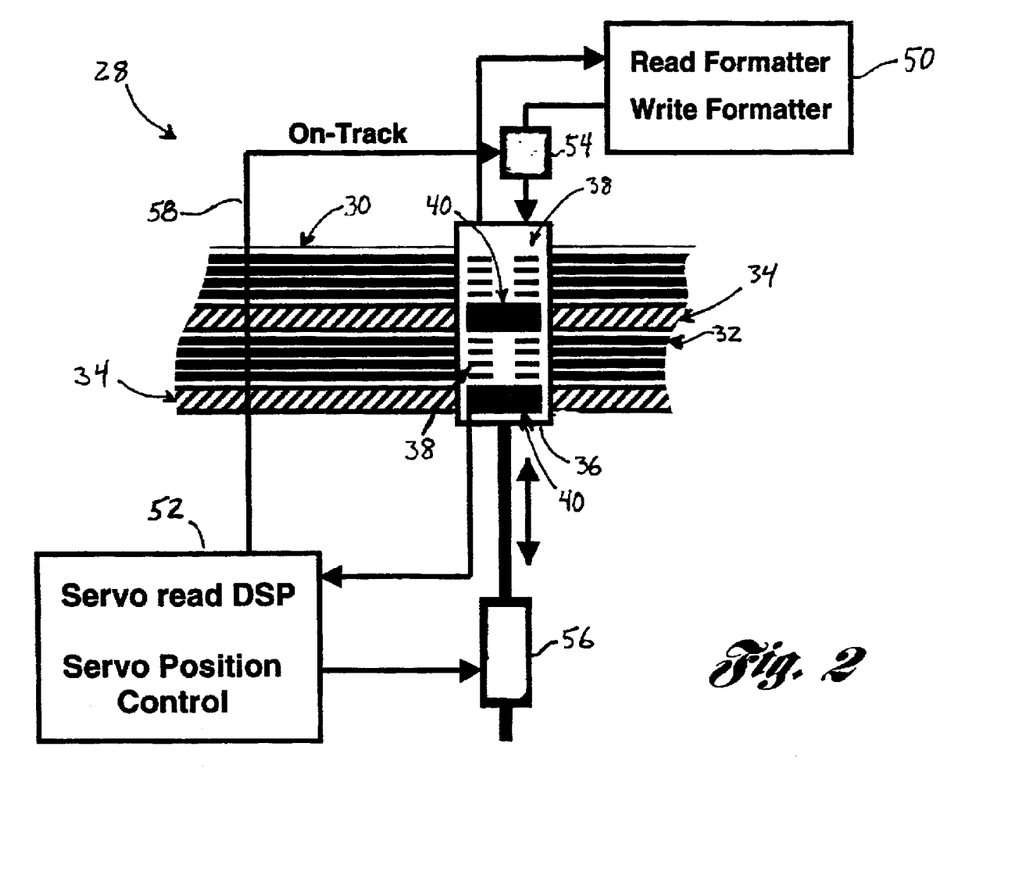
FIG. 2 illustrates a representative storage device and multiple channel storage medium utilizing read/write head positioning tracks and employing tracking error recovery according to one embodiment of the present invention.

FIG. 2 illustrates a representative storage device and multiple channel storage medium utilizing read/write head positioning tracks and employing error recovery according to one embodiment of the present invention. In the representative system 28 illustrated in FIG. 2, storage medium 30 is used to record multiple tracks or channels 32 of information, which are preferably written simultaneously, but may be independently written depending upon the particular application. In this example, storage medium 30 also includes tracking information 34 that may be used to detect the position of read/write head assembly 36 and associated read/write heads 38 and tracking heads 40 relative to storage medium 30.

System 28 includes one or more microprocessors with associated hardware and/or software which implement various functions represented generally by blocks 50 and 52. For example, system 28 generally includes a write formatter that prepares raw data form a data source to be written to storage medium 30. Preparation of data for writing generally includes separating raw data into segments, blocks, or sub-blocks and may include adding various information used by system 28 during the storage and subsequent retrieval process. For example the write formatter may add sequencing or block identification information, error detection information, such as a cyclic redundancy check (CRC), and write pass information. In addition, error correction information may be encoded in the information using any of a number of known error correction codes (ECC). The write formatter may add redundancy to the data using known strategies to apply a specified degree of interleave and rotation to the data to increase the ability of the error correcting code to correct large correlated errors in the data. The write formatter also generally applies an appropriate data modulation code to one or more of the recording channels consistent with the particular storage medium 30. The formatted data is provided to recording hardware 54 which generates a corresponding write current for heads 38 to store the information on moving storage medium 30.

System 28 also generally includes a read formatter, also represented by block 50, which is responsible for taking modulated data generated by corresponding read electronics coupled to heads 38 unformatting the information to recover the raw data. The read formatter may also verify data write quality by comparing the data read from storage medium 30 immediately after writing to the raw data to detect errors, or retrieving the data and storing in a buffer. Data checking and de-formatting generally includes demodulation of the data while checking for errors based on the error detection information (CRC) or based on a comparison during a read back check as described above. The encoded error correction information is used to correct errors when possible as describe in greater detail below.

The position of read/write head assembly 36 relative to storage medium 30 is controlled by a servo system represented generally by block 52. Servo system 52 may include a digital signal processor (DSP) to process signals generated by tracking heads 40 within read/write head assembly 36. Tracking heads 40 read tracking information 34 encoded on storage medium 30 to provide corresponding signals to the DSP. The tracking signals are used by a servo position control to control servo motor 56 and position read/write head assembly 36 relative to storage medium 30 during the storage and retrieval process. The DSP may also provide feedback 58 in the form of a digital or analog signal to write electronics 54 to selectively inhibit the write current if tracking information 34 is insufficient to determine position of read/write head assembly 36 relative to storage medium 30, or if tracking information 34 indicates that read/write head assembly is off-track or about to go off-track. According to the present invention, an off-track signal immediately suspends or inhibits write current to prevent unintentional overwriting of previously recorded information on storage medium 30, while storage medium 30 continues to move past read/write head assembly 36. Servo system 52 then attempts to properly position assembly 36 in the transverse direction relative to medium 30 to regain proper tracking as indicated by tracking information 34. Write formatter 50 repositions data that would have been written to storage medium 30 while the write current was suspended for subsequent storage downstream on storage medium 30.

Figure 3:
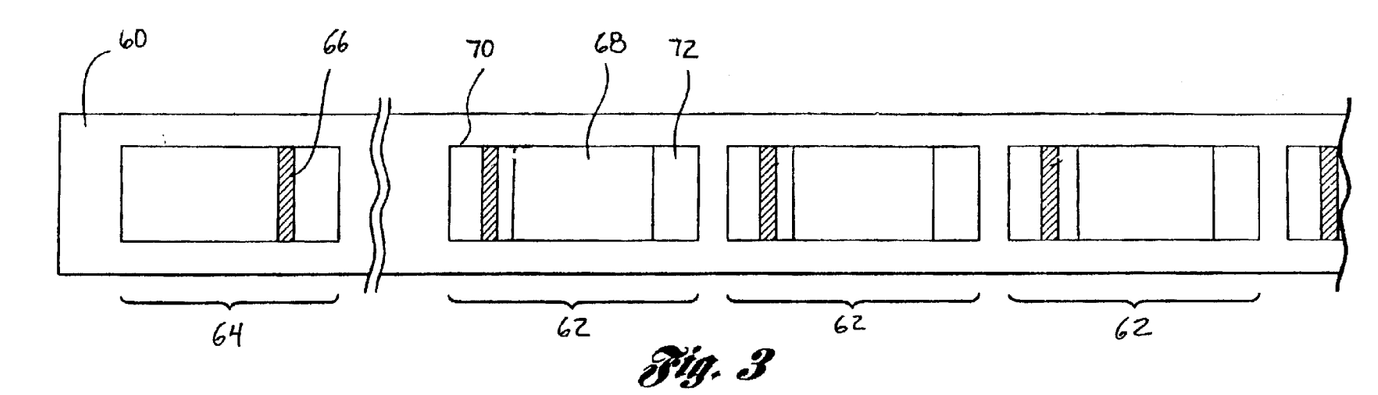
FIG. 3 illustrates representative information stored on a storage medium for use in error recovery according to one embodiment of the present invention.

FIG. 3 illustrates representative information stored on the storage medium for error recovery according to one embodiment of the present invention. Storage medium 60 includes a number of data segments, blocks, or sub-blocks 62 and may include a media or volume control block 64, which may contain information applicable to multiple sub-blocks 62, such as a write pass count indicated generally by reference numeral 66, for example. Write pass information or similar information is preferably used to distinguish current data from previously stored data as described in detail in U.S. Pat. No. 6,288,862 B1, for example. Data sub-blocks 62 represent repositionable units or blocks of information that generally include raw data 68 in addition to information added by the write formatter described above. Added information may be placed in a header 70 and/or trailer 72 and may include error detection code or characters (EDC), write pass information, and sequencing information, for example. Timing or synchronization information may also be stored on medium 60 between data sub-blocks 62. Additional channels or tracks of data may be stored on medium 60 as illustrated in FIG. 2.

Figure 4:
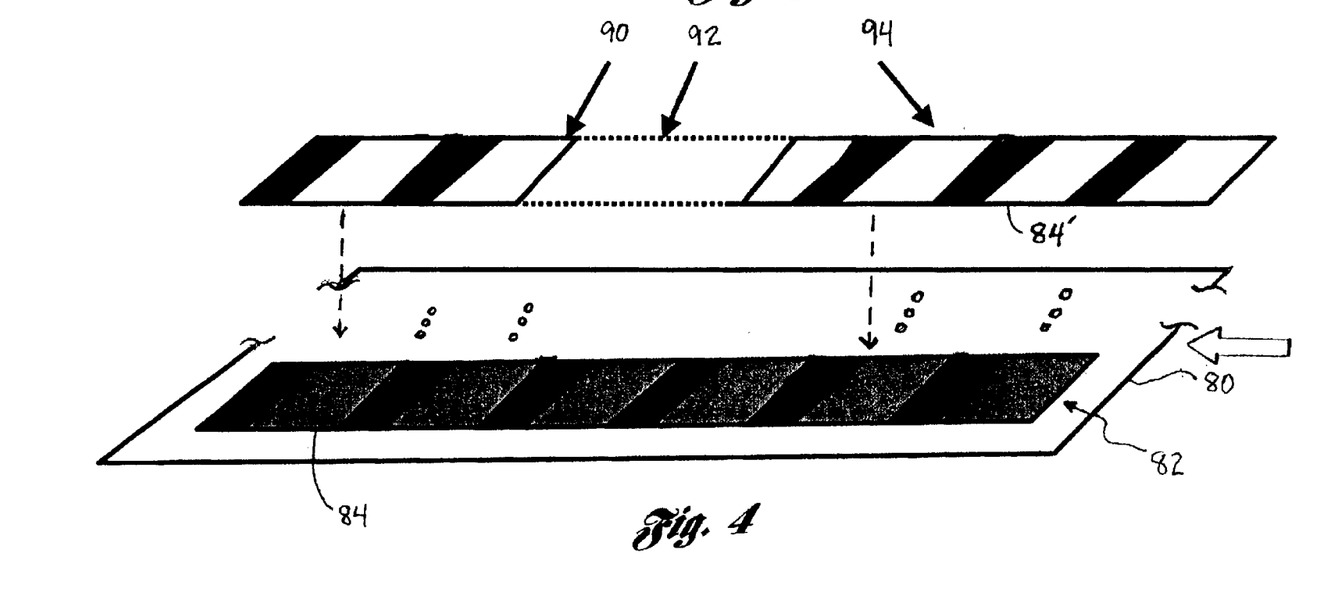
FIG. 4 illustrates operation of one embodiment of the present invention with respect to a tracking error on a multiple channel storage medium having multiple passes or sessions of data.

FIG. 4 illustrates operation of one embodiment of the present invention with respect to a tracking error on a multiple channel storage medium having multiple passes or sessions of data. Storage medium 80 may include multiple channels or tracks, one of which is represented by channel 82. During a first recording session, blocks of data 84 are stored on channel 82 as described above. Blocks of data 84 preferably include information that may be used to associate the blocks with a particular recording session, such as a write pass count as described above. Alternatively, unique block identification numbers and/or sequencing information could be used to associate a block with a particular recording session. During a subsequent recording session, data blocks 84' (that include corresponding session identification information, error detection and/or correction information, etc.) are also written on channel 82 over data blocks 84. When a tracking error occurs as indicated generally at 90, the write current is immediately suspended or inhibited such that data blocks that would have been written to medium 80 in area 92 may be repositioned and written downstream, as indicated generally by reference numeral 94, without stopping and repositioning recording medium 80.

Figure 5:
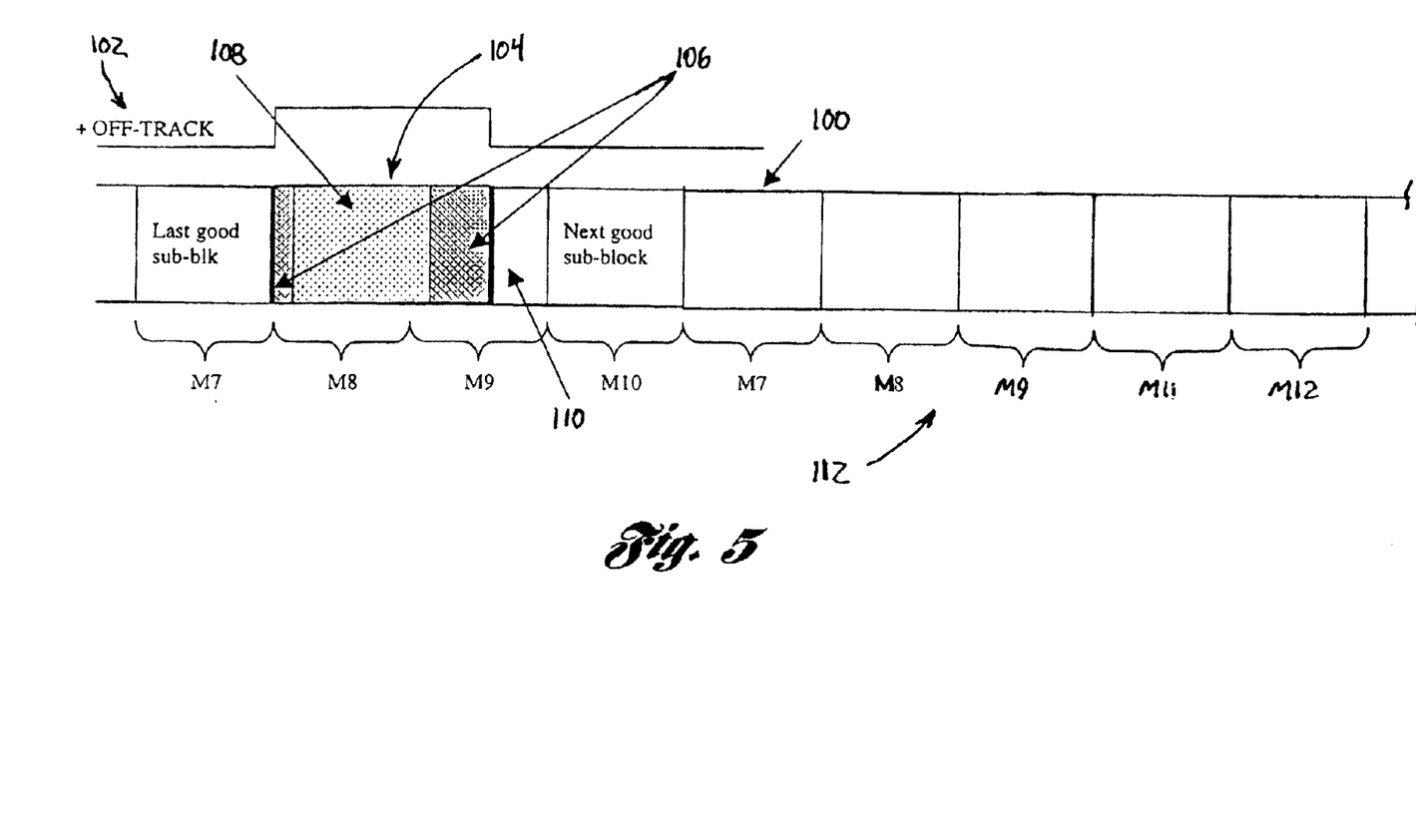
FIG. 5 provides an alternative illustration of tracking error recovery by repositioning sequenced sub-blocks of data according to one embodiment of the present invention.

FIG. 5 provides an alternative illustration of tracking error recovery by repositioning sequenced sub-blocks of data according to one embodiment of the present invention. Data track 100 represents one track of an N-track recording on a suitable storage medium with multiple recording sessions or passes, such as a magnetic tape. An off-track signal 102 may be provided by a read/write head tracking system, such as the representative servo system illustrated and described with reference to FIG. 2. Alternatively, a more general write error signal may be provided by detecting correlated errors during a read back check and/or by error detection information stored with the data as illustrated and described in greater detail with reference to FIG. 6.

Data track 100 includes previously written data sub-blocks indicated generally by reference numeral 104. Previously written data sub-blocks 104 may include portions or fragments 106 of valid sub-blocks and possibly one or more complete sub-blocks 108. During the current recording session or pass, movable sub-blocks of data, represented generally by blocks M7–M12, are to be written to data track 100. After writing movable sub-block M7, off-track signal 102 indicates a writing error and the write current is immediately suspended while allowing the storage medium to continue moving and the write formatter continues to format sub-blocks M8 and M9 for writing. However, because the write current is inhibited until off-track signal 102 indicates proper tracking, only a portion 110 of sub-block M9 is written and the previously written data 104 remains on the storage medium in place of block M8 and a portion of block M9.

Based on the length or span of the write error and the capabilities of the error correction code, the system determines whether the properly recorded information is sufficient to recover the data that would have been written in the sub-blocks (M8 and M9, and optionally adjacent blocks M7 and M10 in this example) spanning the write error. If the data can be recovered using the error correction code, the write formatter continues with blocks M11, M12, etc. If the write error spans a portion of the medium or length of time which exceeds the capability of the error correction code to recover the data, then the affected sub-blocks are repositioned and rewritten downstream on the storage medium, as indicated generally by reference numeral 112. In the example illustrated, the span of the tracking error indicates that data contained in the sub-blocks that would have been written can not reliably be recovered from the error correction code so blocks M7–M9 are repositioned and rewritten after block M10 before continuing to write blocks M11, M12, etc.

Because the previously written data 104 may contain complete sub-blocks with valid error detection information, the system uses write pass information or the like to distinguish current data from previously written data and adjusts the error correction code information accordingly. As such, during subsequent data retrieval from data track 100, the system will discard any data read from previously recorded blocks 108 with otherwise valid error detection information and continue reading data track 100 until the appropriate data blocks are identified downstream at 112.

As such, the present invention provides a unique error recovery method for handling write errors, including servo off-track events, on-the-fly without stopping, repositioning, and rewriting the data. As those of ordinary skill in the art will appreciate, many advantages of the present invention may also be obtained even if the storage medium speed is changed in response to a write error. For example, depending upon the particular application, the tape speed may be reduced in response to a write error to allow additional processing time to determine whether to rewrite the data or rely on the error correction code to recover the data and/or to reposition the read/write head for proper tracking. This may improve the capacity utilization of the storage medium by reducing the span of medium that contains previously written (and therefore unusable) data.

Figure 6:
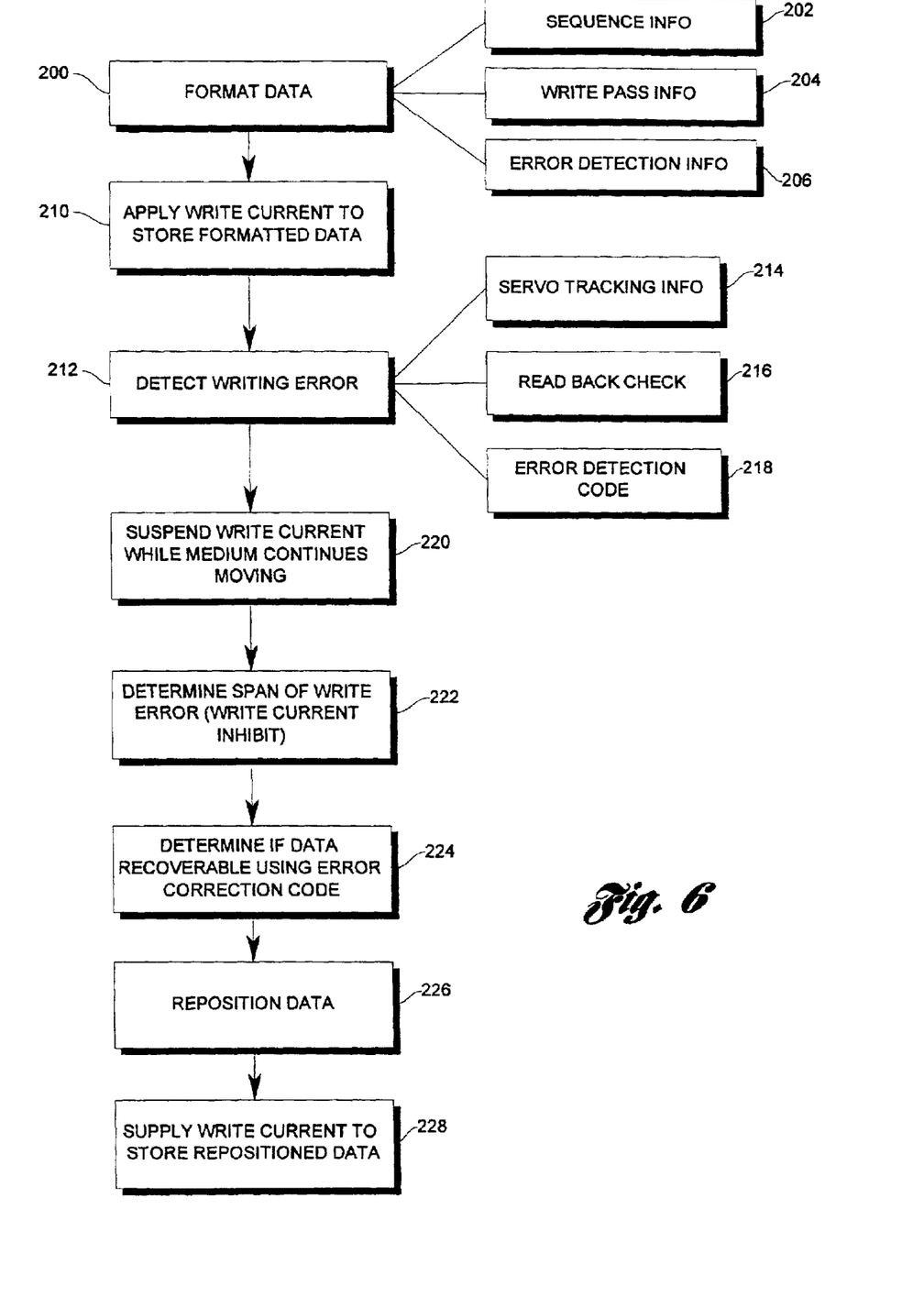
FIG. 6 is a flow chart illustrating operation of a system or method for error recovery according to one embodiment of the present invention.

A flow chart illustrating operation of a system or method for error recovery according to one embodiment of the present invention is shown in FIG. 6. As will be appreciated by one of ordinary skill in the art, the block diagram of FIG. 6 represents control logic which may be implemented or effected in hardware, software, or preferably a combination of hardware and software in communication with one or more programmed microprocessors. Of course, various illustrated functions may be implemented by dedicated electric, electronic, or integrated circuits depending upon the requirements of the particular application. As will also be appreciated by those of skill in the art, the control logic may be implemented using any of a number of known programming and processing techniques or strategies and is not limited to the order or sequence illustrated in FIG. 6. For example, interrupt or event driven processing is typically employed in real-time control applications, rather than a purely sequential strategy as illustrated. Likewise, parallel processing, multi-tasking, or multi-threaded systems and methods may be used to accomplish the objectives, features, and advantages of the present invention. The invention is independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence altogether while accomplishing the features and advantages of the present invention. The illustrated functions may be modified, or in some cases omitted, without departing from the spirit or scope of the present invention. Although not explicitly illustrated, various steps or functions may be repeatedly performed.

In various embodiments of the present invention, the control logic illustrated is implemented primarily in software and may be stored in various types of computer readable storage media accessible to the microprocessor(s). For example, the control logic may be stored as data representing instructions executable by a microprocessor or computer in read only memory (ROM), random access memory (RAM), flash memory, or the like. Although not explicitly illustrated, various steps or functions may be repeatedly performed depending on the type of processing employed.

Block 200 of FIG. 6 represents formatting of raw data for storage. In general, data formatting includes separating or grouping data into movable sub-blocks and incorporating redundancy by applying sufficient interleave and rotation for data recovery using any of a number of known error correction codes. To make each sub-block movable or relocatable, each block preferably includes identification and/or sequencing information 202, write pass information 204, and error detection information 206. Each sub-block of formatted data is then written to the storage medium by supplying an appropriate write current as represented by block 210. The writing process is monitored to detect a writing error as represented by block 212. A writing error may be indicated based on read/write head tracking information 214, comparison of the data from a read back check 216, or based on error detection information, such as a cyclic redundancy check (CRC) 218, for example. Appropriate action is then taken depending upon the magnitude and type of errors detected. For example, if the errors are detected by a read back check, and the data can be recovered using the error correction code, recording may proceed without taking corrective action. However, if a servo tracking error is indicated, corrective action may be immediately initiated to avoid unintentional overwriting of previously recorded data. A combination of writing error detection strategies may also be used to determine whether to take corrective action and implement some form of error recovery, or to proceed with recording of subsequent data without any corrective action and relying on the error correction code to fix the errors and accurately recover the data.

Corrective action may include selectively inhibiting or suspending write current while continuing to format the data and allowing the recording medium to continue moving as represented by block 220. While write current is suspended, the span of the writing error may be determined or measured as represented by block 222 until the error(s) are no longer detected. The span may then be used to determine whether the data formatted during the suspension is otherwise recoverable as represented by block 224 without being rewritten downstream. The span may be determined based on time, amount of data, number of sub-blocks, length or "wasted" capacity of storage medium, etc. If the data may be reliably recovered using the error correction code, for example, then it is preferably not repositioned and rewritten so that speed, throughput, and overall efficiency are increased. If the span exceeds a corresponding threshold and block 224 determines that the data is not recoverable using other means, the data may be repositioned as represented by block 226 and rewritten downstream by supplying an appropriate write current as represented by block 228. However, an upper threshold on the span of the writing error may also be imposed with alternative corrective action imposed if exceeded. For example, if the span exceeds an upper threshold, the storage medium may be stopped and repositioned to avoid unnecessarily reducing the overall storage capacity of the storage medium by having large segments of unusable data. Accordingly, a processor measures the span of the writing error and repositions and writes the data only if the span of the writing error is between first and second thresholds wherein the first threshold is based on the span and the error correction information and the second threshold is based on the span and capacity of the storage medium.

As such, the writing error recovery system and method provided by the present invention improve overall efficiency of the storage process by improving capacity utilization, overall recording speed, and throughput. Capacity utilization is improved by providing write pass information and sequencing information within smaller recording units or sub-blocks of data which can be repositioned, when necessary, without rewriting an entire data block. Overall recording speed and throughput are improved by reducing the number of stops and restarts of the recording medium. The reduced number of stops and restarts of the storage medium may also reduce associated wear on various components of the storage device and the storage medium.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for storing data on a magnetic tape by positioning a write head over the moving magnetic tape and providing a write current to the write head, the method comprising:
   detecting a writing errors wherein the writing error is indicated by at least one of a data read back check and write head tracking information;
   measuring span of the writing error;
   disregarding the writing error when the writing error is indicated by the data read back check and the span of the writing error is less than a first threshold wherein the first threshold is based on the span of the writing error and capability of error correction information to recover mis-recorded data;
   suspending the write current in response to the writing error while allowing the magnetic tape to continue moving when the writing error is indicated by die write bead tracking information;
   repositioning data that would have been stored during the span of the writing error when the span of the writing error is greater than the first threshold;
   repositioning the magnetic tape when the span of the writing error is greater than a second threshold wherein the second threshold is greater than the first threshold and is based on the span of the writing error and capacity of the magnetic tape; and
   supplying the write current to write die repositioned data when the span of the writing error is greater than at least one of the first threshold and the second threshold.

2. The method of claim 1 wherein error correction information is encoded in the data on the magnetic tape and wherein the step of detecting a writing error comprises:
   comparing data written to the magnetic tape to data read from the magnetic tape to detect errors in the data.

3. The method of claim 1 wherein error detection and correction information is encoded in the data on the magnetic tape and wherein the step of detecting a writing error comprises:
   reading the error detection information to detect errors in the data; and
   wherein the steps of repositioning data and supplying write current to store the repositioned data are performed if errors in the data can not be corrected using the encoded error correction information.

4. The method of claim 1 wherein the step of detecting a writing error comprises:
   indicating a writing error based on positioning of the write head relative to the magnetic tape.

5. The method of claim 4 wherein the step of detecting a writing error comprises:
   indicating a writing error based solely on positioning of the write head relative to the magnetic tape.

6. The method of claim 1 wherein the includes write head tracking information and wherein the step of detecting a writing error comprises:
   indicating a writing error based on the write head tracking information.

7. The method of claim 1 further comprising:
   formatting data for writing by grouping data into sub-blocks, adding sub-block sequencing information, write pass information, and error detection information to each sub-block of the data.

8. The method of claim 1 further comprising distinguishing current data from previously written data stored on the magnetic tape.

9. A system for storing data on a moving magnetic tape, the system comprising:
   a servo position control for positioning a read/write head relative to the magnetic tape and providing a tracking signal indicative of read/write head position relative to tracking information on the magnetic tape; and
   a processor for grouping data to be stored on the magnetic tape, adding write pass information, encoding error correction and detection information in the data, detecting a writing error wherein the writing error is indicated by at least one of a data read back check and the write head tracking information, and measuring span of the writing error wherein the processor disregards the writing error when the writing error is indicated by the data read back check and the span of the writing error is less than a first threshold wherein the first threshold is based on the span of the writing error and capability of error correction information to recover mis-recorded data, suspends write current in response to the writing error while allowing the magnetic tape to continue moving when the writing error is indicated by the write head tracking signal relative to the tracking information, repositions data that would have been stored during the span of the writing error when the span of the writing error is greater than the first threshold, repositions the magnetic tape when the span of the writing error is greater than a second threshold wherein the second threshold is greater than the first threshold and is based on die span of the writing error and capacity of the magnetic tape, and supplies the write current to write the repositioned data when the span of the writing error is greater than at least one of the first threshold and the second threshold.

10. The system of claim 9 wherein the processor compares data written to the magnetic tape to data read from the magnetic tape to detect errors.

11. The system of claim 9 wherein the processor selectively suspends the write signal based on positioning of the write head relative to the magnetic tape.

12. The system of claim 11 wherein the processor selectively suspends the write signal based solely on positioning of the write head relative to the magnetic tape.

13. The system of claim 11 wherein positioning of the write head relative to the magnetic tape is detected based on a comparison of data written to, and read from, the magnetic tape.

14. The system of claim 11 wherein positioning of the write head relative to the magnetic tape is detected based on write head tracking information stored an the magnetic tape.

15. The system of claim 9 wherein the magnetic tape comprises data having read/write head tracking information and a plurality of generally parallel data channels.

16. A computer readable storage medium having stored data representing instructions executable by a processor to control a magnetic tape device that positions a write head over a moving magnetic tape and provides a write current to the write head, the computer readable storage medium comprising:

instructions for detecting a writing error, wherein the writing error is indicated by at least one of a data read back check and write head tracking information;

instructions for measuring span of the writing error;

instructions for suspending the write current in response to the writing error while allowing the moving magnetic tape to continue moving when the writing error is indicated by the write head tracking information;

instructions for disregarding the writing error when the writing error is indicated by the data read back check and the span of the writing error is less than a first threshold wherein the first threshold is based on the span of the writing error and capability of error correction information to recover mis-recorded data;

instructions for repositioning data that would have been stored during the span of the writing error when the span of the writing error is greater than the first threshold;

instructions for repositioning the magnetic tape when the span of the writing error is greater than a second threshold wherein the second threshold is greater than the first threshold and is based on the span of the writing error and capacity of the magnetic tape; and instructions for supplying the write current to write the repositioned data on the moving magnetic tape when the span of the writing error is greater than at least one of the first threshold and the second threshold.

17. The computer readable storage medium of claim 16 wherein error correction information is encoded in the data on the moving magnetic tape and wherein the instructions for detecting a writing error comprise:

instructions for comparing data written to the moving magnetic tape to data read from the moving magnetic tape to detect errors in the data; and instructions for indicating a writing error if errors in the data exceed a corresponding read back error threshold.

18. The computer readable storage medium of claim 16 wherein error detection and correction information is encoded in die data on the moving magnetic tape and wherein the instructions far detecting a writing error comprise:

instructions for reading the error detection information to detect errors in the data; and instructions for indicating a writing error if errors in the data can not be corrected by the encoded error correction information.

19. The computer readable storage medium of claim 16 wherein the instructions for detecting a writing error comprise:

instructions for indicating a writing error based on positioning of the write head relative to the moving magnetic tape.

20. The computer readable storage medium of claim 19 wherein the instructions for detecting a writing error comprise:

instructions for indicating a writing error based solely on positioning of the write bead relative to the magnetic tape.

21. The computer readable storage medium of claim 16 wherein the moving magnetic tape includes data having write head tracking information and wherein the instructions for detecting a writing error comprise:

instructions for indicating a writing error based on the write bead tracking information.

22. The computer readable storage medium of claim 16 further comprising:

instructions for formatting data for writing by grouping data into sub-blocks, adding sub-block sequencing information, write pass information, and error detection information to each sub-block of the data.

23. The computer readable storage medium of claim 16 further comprising instructions for distinguishing current data from previously written data stored on the moving magnetic tape.

* * * * *